United States Patent [19]

Patil et al.

[11] Patent Number: 5,605,755

[45] Date of Patent: Feb. 25, 1997

[54] LOW COST, ASBESTOS FREE FRICTION MATERIAL

[75] Inventors: Arvind S. Patil, Williamsburg, Va.; George P. Boyd, Jr., North Attleboro, Mass.

[73] Assignee: Textron Systems Corporation, Wilmington, Mass.

[21] Appl. No.: 473,435

[22] Filed: Jun. 7, 1995

Related U.S. Application Data

[63] Continuation of Ser. No. 132,762, Oct. 6, 1993, Pat. No. 5,508,109.

[51] Int. Cl.$^6$ ........................................................ D02G 3/04
[52] U.S. Cl. ........................ 428/364; 428/367; 428/394; 523/153; 264/29.2

[58] Field of Search .................................. 428/364, 367, 428/394; 523/153, 149; 264/29.2

[56] References Cited

U.S. PATENT DOCUMENTS

| | | | |
|---|---|---|---|
| 3,935,924 | 2/1976 | Nagao et al. | 181/169 |
| 4,866,107 | 9/1989 | Doxsee et al. | 523/153 |
| 5,078,926 | 1/1992 | McHenry et al. | 264/29.2 |

*Primary Examiner*—Tae Yoon
*Attorney, Agent, or Firm*—Edmund J. Walsh; Scott A. McNeil

[57] ABSTRACT

A fiber blend for use in friction materials. The fiber contains a blend of a highly fibrillated fiber, such as a fibrillated polyacrylonitrile fiber and a fiber with a high carbon content, such as an oxidized carbon fiber precursor.

4 Claims, 3 Drawing Sheets

LOW COST, ASBESTOS FREE FRICTION MATERIAL

This is a continuation of application Ser. No. 08/132,762, filed on Oct. 6, 1993, now U.S. Pat. No. 5,508,109.

This invention relates generally to friction materials and more specifically to fibrous fillers in friction materials.

Friction materials are used in many forms. As used herein, the term "friction material" refers to a component of an assembly which is attached to a moving body.

In use, the friction material is pressed against another member. Either the friction material or other member moves when the body moves such that pressing the friction material against the other member generates a frictional force which retards motion of the body or couples a motive force to the other member. For example, in a brake assembly attached to a car, a brake pad presses against a brake disc. The frictional force generated in the brake assembly retards motion of the car. As another example in a transmission assembly in a car, a clutch plate coupled to the wheels of the car is pressed against a clutch plate attached to the engine. The frictional force between the clutch plates couples motive force from the engine to the wheels making the car move.

Perhaps the largest and most important use of friction materials is in brakes. One widespread way of making brake materials is to first form a mix. In this method, various fillers are mixed with a thermoset resin and then pressed at an elevated temperature until the resin cures, holding the fillers together in a cohesive mass. Various types of mounting means can be attached to the brake material, either during the pressing or after, so it can be mounted to a vehicle.

The specific fillers and amounts used in any given brake material is generally a closely guarded-secret of the manufacturer. However, there are certain characteristics of brake materials which are generally measured and used for comparison to other materials.

Compressive and flexural strengths of the brake material are important. During braking, and to a lesser extent just in handling the materials, various forces are imposed on the brake materials. The brake material must not prematurely crack or fall apart in the face of these forces. To test brake materials, the flexural and compressive strengths of material are measured by applying forces to test specimens until they break. Since the brake material heats up during use due to frictional heating, these mechanical properties are measured both at room temperature and at the elevated temperature.

Also, because the brake material heats up during use, the coefficient of thermal expansion of the brake material is measured. If the material expands too much when heated, internal stress in the brake material will be generated which cause the material to crack.

The friction properties of the brake materials are also very important. When the brake material is pressed against a member, a sufficient frictional force must be generated for the brake to function properly. Ideally, this frictional force will be the same at all temperatures and wear conditions. For example, when the frictional force decreases as the brake heats up, a very undesirable phenomenon called "high temperature fade" occurs. Accordingly, frictional properties are measured on a dynamometer to simulate the conditions to which the brake material is subjected in actual use.

In designing friction components, tradeoffs must be made among the various parameters of the friction material. For example, a high coefficient of friction, which is often desirable, generally means a high wear rate which is undesirable. Also, in addition, the intended application dictates what properties are desirable. For example, the friction material in the front brakes of cars could be different than the friction material in the rear brakes. As another example, a high compressive strength is desirable because such materials are less likely to crack and fail. However, a low compressive strength can also be desirable because it could imply that the material is softer and will conform to the surface of another member pressed against it. Such an attribute can also be important in a brake because it leads to more even wear and a larger working surface of the friction material. Accordingly, the measured properties are used as a guide with some interpretation based on the intended use of the friction material land subjective assessment of desirable tradeoffs.

Some processes for making brake materials are multistep processes. In a multistep process, the mixture is first molded into a preform which is sometimes referred to as being in the "green state". The preform is then pressed at an elevated temperature until the resin softens, flows and cures, holding the preform together.

The mixture must also have a good green strength. In other words, when the mixture is formed into a perform, it must stay together and withstand handling so that it can be placed in a hot press to form the finished material. Green strength is measured indirectly by measuring the resiliency of the material. Resiliency is measured by compressing the mixture at a specified pressure for a specified period of time. The pressure is then removed and the increase in thickness of the mixture is measured after a set period of time. A smaller increase in thickness indicates a higher green strength. As a rule of thumb, a maximum of 10% increase in thickness (i.e. 10% resiliency) is desirable for forming brakes in a multistep process.

Traditionally, brake materials contained a large amount of asbestos. Asbestos is a naturally occurring fiber material. It provided good green strength, flexural strength and compressive strength and was very stable at elevated temperatures. It also provided very good friction properties and is very inexpensive. Asbestos is not now favored due to the concern that improper handling during manufacture of the friction material could injure workers. As a result, the brake industry has been searching for a replacement for asbestos for a long time.

KEVLAR® (trademark of Dupont for aramid fibers) has been used in brakes to replace asbestos. In U.S. Pat. No. 4,374,211 to Gallagher et al. a blend of pulped and unpulped KEVLAR fiber is used. The pulp is highly fibrillated and provides very good green strength. The unpulped KEVLAR provides reinforcement for the brake material. KEVLAR also has acceptable high temperature performance, softening at temperatures above 300° C. Unfortunately, it has a relatively high cost which prevents a more widespread use.

Other fibrillated fibers have been used in brake materials. For examples, U.S. Pat. No. 4,886,706 to Rush et al. describes a fibrillated polyacrylonitrile fiber used to reinforce friction materials. Likewise, U.S. Pat. No. 4,866,107 to Doxsee et al. describes use of fibrillated acrylic fibers in friction material. Such fibrillated fibers give good green strength and also room temperature strength. However, acrylic fibers generally soften at temperatures above 200° C. and are therefore not thought to provide high temperature strength or to improve frictional characteristics.

Various other types of fibers are used in friction materials to replace asbestos. "Semi-metallic" systems typically include steel, brass, or copper fibers as a primary reinforcement. Carbon fibers or carbon particles are sometimes used in semimetallic brakes because they produce a powder as they wear which prevents the metal fibers from being too abrasive. Carbon fibers have also been used separately for reinforcement. SAE Technical Paper 911951 describes beneficial effects of carbon fibers in brakes. However, the fibers described in that paper are likely in excess of 95% carbon and are therefore expensive to produce. Chopped, oxidized polyacrylonitrile (PAN) fibers have a carbon content of around 60% and are less expensive than fibers which are more fully carbonized. They have also been used in friction materials.

Combinations of fibers have also been suggested. U.S. Pat. No. 5,004,497 to Shibata et al. describes a combination of fibrillated aramid fibers and carbon fibers. U.S. Pat. No. 4,373,038 to Moraw et al. describes a mixture of aramid fibers, mineral fibers and metal fibers. U.S. Pat. No. 4,866,107 to Doxsee et al. mentions that fibrillated PAN fiber may be used as a complete or partial replacement for fibers conventionally used in friction materials. U.S. Pat. No. 4,508,855 to Peters describes a mixture of acrylic fiber and refractory fiber. In friction materials, fibrillated PAN has been used as a partial replacement for KEVLAR.

SUMMARY OF THE INVENTION

With the foregoing background in mind, it is an object of this invention to provide a relatively low cost fibrous material for use in friction materials.

It is also an object to provide a fiber blend which can be added to a friction mixture in one processing step and dispersed easily.

It is also an object to provide friction materials reinforced with fibers which provide the friction material with good green strength, good mechanical properties, and good frictional properties.

It is also an object to provide a fiber blend which can be added to a friction mixture in one processing step and dispersed easily.

It is also an object to provide friction materials reinforced with fibers which provide the friction material with green strength, good mechanical properties and good frictional properties.

The foregoing and other objects are achieved in a friction material comprising fibrillated synthetic fibers in a weight percent preferably between 1% and 6% and short lengths of oxidized carbon fiber precursor in a weight percent preferably between 1% and 6% with the ratio of fibrillated to oxidized PAN preferably in the range of 10:1 to 1:10. The carbon fiber precursor is preferably shorter than one quarter inch.

Accordingly to one feature of the invention, the oxidized carbon fiber precursor and synthetic fiber are combined into a fiber blend and fibrillated in one processing operation.

BRIEF DESCRIPTION OF THE DRAWINGS

The invention will be better understood by reference to the following detailed description and accompanying figures in which.

DESCRIPTION OF PREFERRED EMBODIMENT

We have discovered that a useful fibrous reinforcement for friction material is a blend of fibrillated polyacrylonitrile fiber and oxidized polyacrylonitrile (PAN) fiber. As the following examples indicate, such a blended fiber provides green strength, mechanical properties and frictional properties which compare very favorably to KEVLAR. However, such advantageous properties are achieved with a synthetic fiber which is much lower cost.

Figure 1:
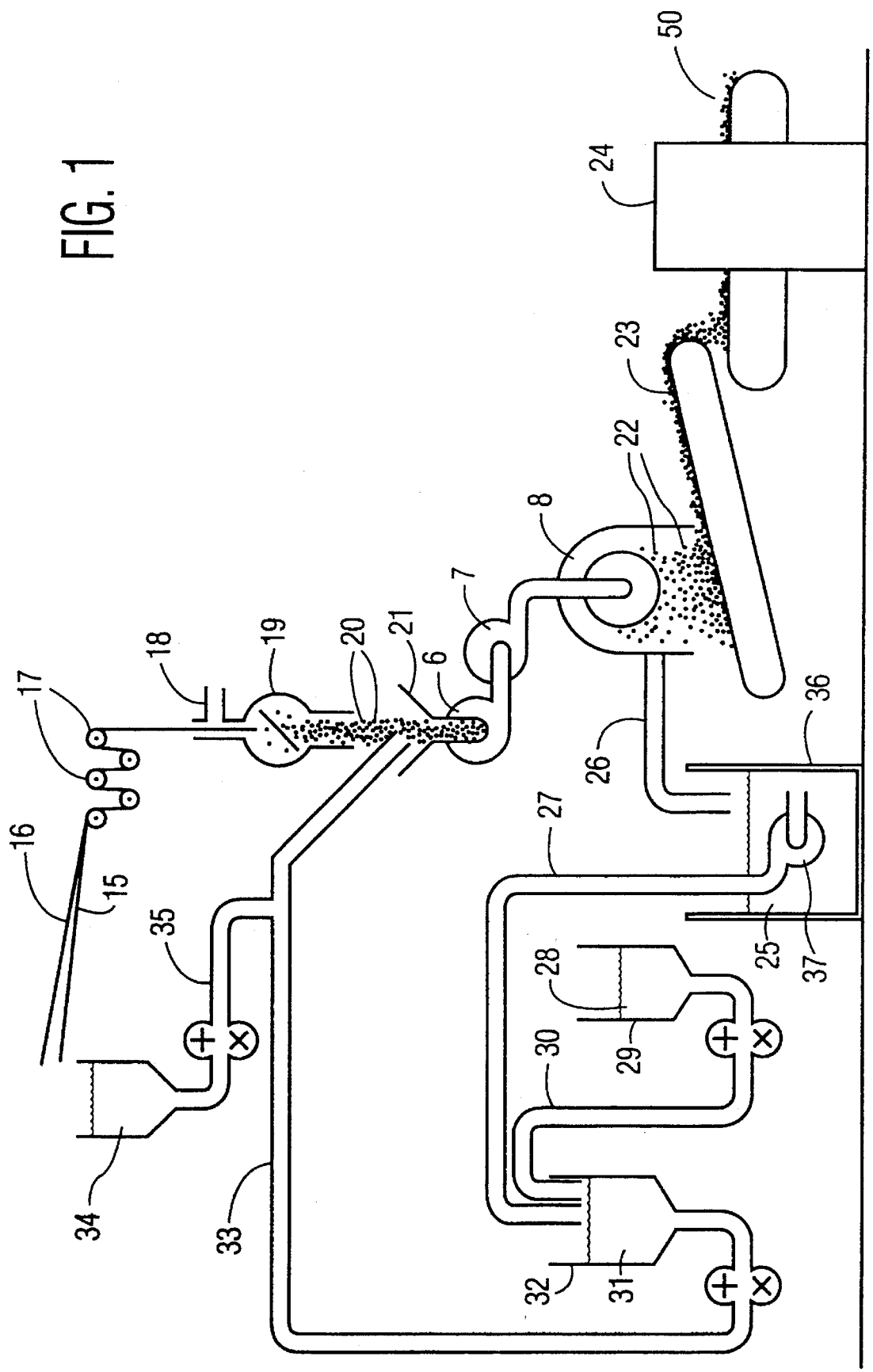
FIG. 1 shows a schematic of a process useful for making blended fiber.

U.S. Pat. No. 4,886,706 (which is hereby incorporated by reference) describes a method of producing a fibrillated PAN fiber. As used herein, the method of U.S. Pat. No. 4,886,706 is modified to process PAN and oxidized PAN fibers simultaneously. The FIG. 1 shows a tow of PAN fiber 16 and a tow of oxidized PAN fiber 15.

Tows 15 and 16 are forwarded by a set of five feed rolls 17, drawn into an aspirator 18 and cut in a cutter 19. Cutter 19 is set to cut tows 15 and 16 into lengths preferably between about 1 mm and 50 mm. More preferably, the cut lengths will be between about 5 mm and 20 mm and most preferably around 10 mm.

Optionally, tank 32 supplies a dilute additive solution 31 to the cut tow 20, the dilute additive solution 31 being supplied to a vortex bowl 21 via pipe 33.

Any one of the additives in U.S. Pat. No. 4,886,706 could be used. As an example, PEG-400 monopelargonate could be used. Preferably, an antifoamant 34 is also added to the vortex bowl 21 via pipe 35 simultaneously with the addition of the dilute additive solution 31 to the vortex bowl 21. A suitable antifoamant 34 is that manufactured by Dow Corning of Midland, Mich., and is known as H-10. The antifoamant is preferably added at a rate of 14 cc. per minute.

The cut tow 20 along with antifoamant 34 and solution 31 are supplied to the first refiner 6 at a ratio of fifty pounds of solution 31 for every one pound of fiber (on a dry weight basis). Fiber is supplied to cutter 19 at a rate of around two pounds of fiber (on a dry weight basis) per minute. The wet gel is refined in the refiners 6 and 7, after which excess liquid is removed from the pulped fiber/additive via centrifuge 8. The additive/refined gel 22 passed from the centrifuge 8 into a dryer 24, via a conveyor 23, the dryer removing substantially all of the water from the additive/refined gel 19, causing the gel structure to collapse. The finished blended fiber 50 emerges from dryer 24 and is packaged in any conventional manner.

Preferably, the dilute additive solution is recycled. In addition to the additive/wet gel mixture 22, the centrifuge 8 also emits excess liquid comprised of a very dilute additive solution 25 through pipe 26, along with foam (not shown) which was created during the refining process. These emissions are fed into an effluent tank 36 via pipe 26. In the effluent tank 36, the liquid 25 is separated from the foam. The liquid is then pumped (via pump 37) to the dilute additive tank 32 via pipe 27. Since liquid 25 has a lower concentration of additive than the concentration necessary for application with the chopped tow, the dilute additive tank 32 is supplied with a very dilute solution of water and additive from effluent tank 36 along with a concentrated additive solution 28 from another tank 29. The concentrated additive solution 28 is supplied to the dilute additive tank 32 via pipe 30. The solution provided by pipe 33 preferably has a concentration between 0.1% and 1% be weight and typically around 0.3%.

Blended fiber 50 contains a uniform blend of fibrillated and Oxidized PAN fibers. Refiners 6 and 7 serve to fibrillate PAN tow 16. However, rather than fibrillate oxidized PAN 15, refiners 6 and 7 break oxidized PAN 15 into short random lengths. An average length of 3 to 20 mm is preferred with a length of less than 10 mm being more preferred. The standard deviation of length is preferably at least 0.5 mm and more preferably 1 mm or more.

Refiners 6 and 7 are commercially available equipment, often used in the paper making industry. Refiners 6 and 7 are collectively sized to fibrillate PAN tow 16 into fibers having a surface area preferably in excess of 10 $m^2/gm$, more preferably above 40 $m^2/gm$, and most preferably between 60 and 80 $m^2/gm$.

The tow of PAN fiber 16 is as described in the aforesaid U.S. Pat. No. 4,886,706. Oxidized tow 15 is made by oxidizing a PAN tow. For example, PAN tow from Courtaulds of Coventry England may be heated in an oxidizing oven to a temperature of 450° F. for a period of two to four hours. The resulting oxidized tow has a carbon content of between 60% and 70% by weight. The tow had roughly 320,000 filaments and a denier per filament of approximately 1.5 and a surface area between 1 and $2m^2/gm$. Optionally, the oxidized tow could be further heated in a carbonizing furnace to increase the carbon content of the tow to up to 99.5% by weight. A carbonized tow would retain its strength at higher temperatures than an oxidized tow. However, the step of carbonizing the fiber adds cost to the manufacturing operation and is preferably omitted.

According to the process shown in FIG. 1, the ratio of the number of ends multiplied by the denier per filament of PAN tow 16 to the number of ends multiplied by the denier per filament oxidized PAN tow 15 will dictate the ratio of the weight ratio of fibrillated to oxidized PAN in blended fiber 50. A weight ratio of 1:10 to 10:1 is preferred with a ratio of 1:1 to 3:1 being more preferred. The most preferred ratio is between 1:1 and 3:2.

A blended fiber produced according to the invention is useful for making friction materials, as illustrated by the following Examples.

Example I

The mixture in Table I is intended to represent what might be used in the manufacture of friction materials.

TABLE I

| Material | Weight % |
|---|---|
| Bayrite | 21.54 |
| Phenolic Resin | 18.60 |
| Graphite Particles | 2.15 |
| Pulverized Mineral Fiber | 37.72 |
| Rubber Dust | 2.84 |
| Friction Particles | 6.36 |
| Vermiculite | 10.79 |

A master batch was prepared according to the proportions in Table I. It was mixed for 10 minutes in an Eirich mixer (model R02) as described in the aforementioned U.S. Pat. No. 4,886,706. For friction particles, type 10A-40 from Colloid Chemical, Inc. of Cedar Knolls, N.J. were used.

Four samples of the master batch were measured out. To the first, designated $C_1$, no fibers were added. To the second, designated $C_2$, 3% of fibrillated PAN fibers were added. To the third, designated $C_3$, 3% KEVLAR pulp was added. To the fourth, designated $C_4$, 1.5% fibrillated PAN and 1.5% pulped KEVLAR was added. To the fifth, designated $I_1$, 3% of a blend of fibrillated PAN and oxidized PAN was added. The weight ratio of fibrillated to oxidized PAN was approximately 3:2.

The samples were then mixed for an additional 5 minutes or until the fibers are uniformly dispersed throughout the friction material. The mixes were then placed into a first mold and pressed to form a green state preform. The material was pressed at 1,300 psi for 30 seconds, released for 15 seconds and then pressed again at 1,300 psi for 30 seconds. The preforms were unmolded and placed in a second mold where they were pressed at an elevated temperature to form a block. Here, the blocks were heated to 330° F. and pressed at 1,300 psi for 30 seconds, released for 15 seconds and pressed for 11 minutes at 2,500 psi. The blocks were machined to provide samples according to standardized tests for flexural strength (ASTM D790), compressive strength (ASTM D695), coefficient of thermal expansion (ASTM D696) and friction and accelerated wear properties (SAE J661). Blocks for flexural testing were machined to 0.5" wide by 0.25" thick by 5" long and tested with a reaction span of 4". The test was Conducted with a crosshead rate of 0.5"/minute. Blocks for compression testing were 0.25" cubes. They were tested with a crosshead rate of 0.05"/minute. Coefficient of thermal expansion was measured from room temperature to 400° F. on 2"×0.25"×0.25" blocks.

Figure 2A:
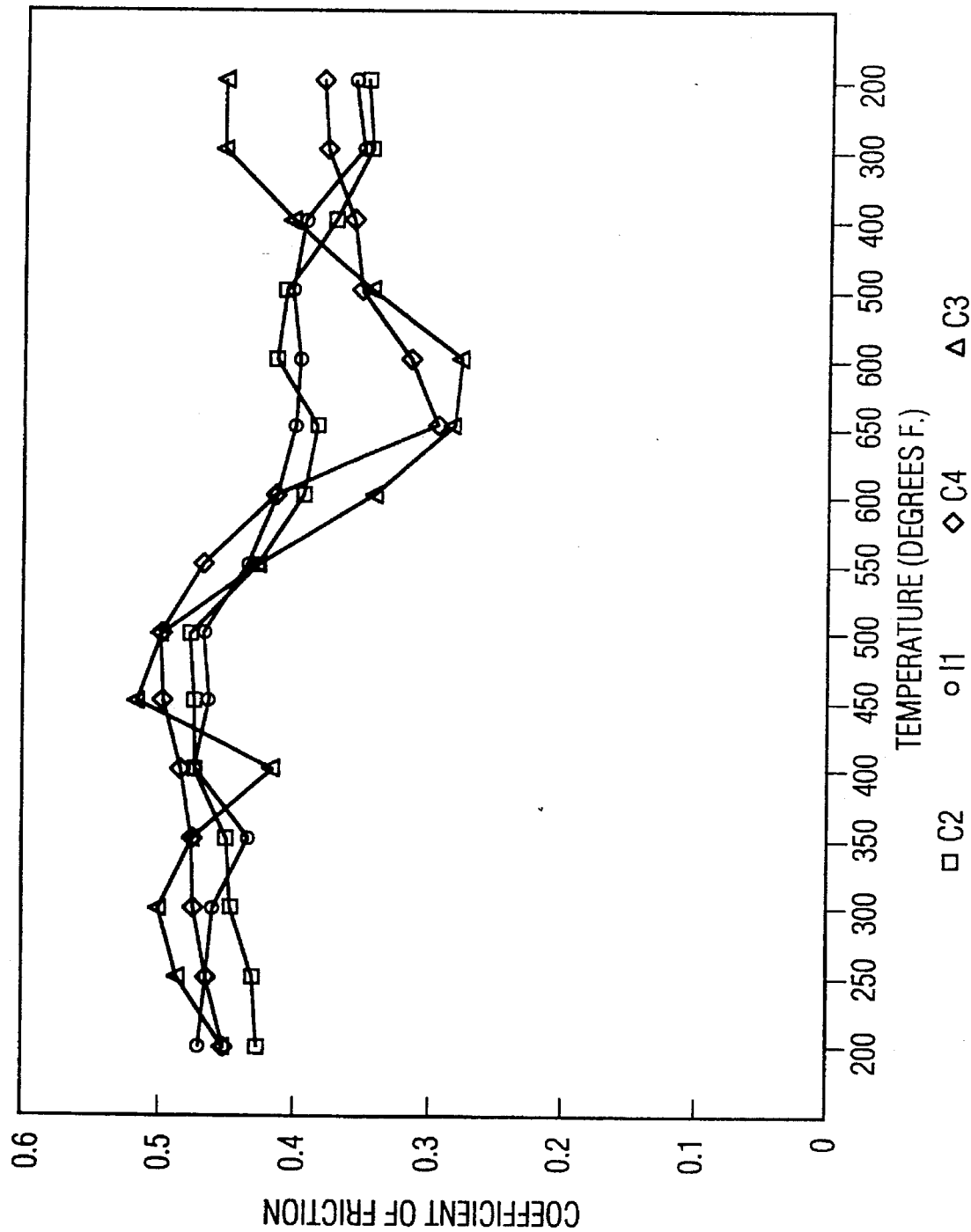
FIG. 2A is a graph showing second fade and recovery data for the samples of Example I.

Separately, a 10 gm sample of each mix was placed in a press at 2,500 psi for 1 min. The thickness of the sample was measured and the press was released. After 4 minutes, the thickness of the sample was measured again and the percentage increase in thickness was reported as the resiliency. The same tests were performed on all samples except $C_1$, which lacked sufficient green strength to handle for subsequent tests. Table II shows the results of the ASTM tests reflecting an average of five samples. Table III shows the results of the coefficient of friction and wear data measurements of the SAE J661 test. FIG. 2A shows in graphical form the data from the "second fade and recovery" portion of the SAE J661 test. The SAE J661 test results reflect an average of three samples. Results of an "accelerated wear" test performed by Greening are also reported. Some skilled in the art feel this test is a more accurate predictor of wear than the wear component of the J661 test.

TABLE II

| | ASTM D790 | | | | ASTM D695 | | | |
|---|---|---|---|---|---|---|---|---|
| | ROOM TEMP | | 400° F. | | ROOM TEMP | 400° F. | | |
| SAMPLE | stress (psi) | modulus (msi) | stress (psi) | modulus (msi) | stress (psi) | stress (psi) | ASTM D696 ($10^6$ in/in. F.°) | Resiliency (% Rebound) |
| $C_1$ | — | — | — | — | — | — | — | — |
| $C_2$ | 4875 | 1.27 | 2731 | 0.60 | 7912 | 4670 | 7.89 | 6.5 |
| $C_3$ | 5158 | 1.47 | 2270 | 0.51 | 8320 | 5812 | 6.70 | 5.8 |
| $C_4$ | 4801 | 1.39 | 2648 | 0.63 | 8737 | 5240 | 7.32 | 4.9 |
| $I_1$ | 4523 | 1.29 | 2670 | 0.57 | 5960 | 3620 | 8.24 | 10.1 |

TABLE III

| SAMPLE | Mean Coefficient of Friction | | Wear (% Loss) | Accelerated Wear (% Loss) |
| --- | --- | --- | --- | --- |
| | Normal | Hot | | |
| $C_1$ | — | — | — | — |
| $C_2$ | 0.45 | 0.38 | 7.59 | 8.10 |
| $C_3$ | 0.48 | 0.39 | 7.51 | 7.39 |
| $C_4$ | 0.49 | 0.42 | 8.80 | 5.83 |
| $I_1$ | 0.47 | 0.39 | 10.87 | 5.51 |

EXAMPLE II

Figure 2B:
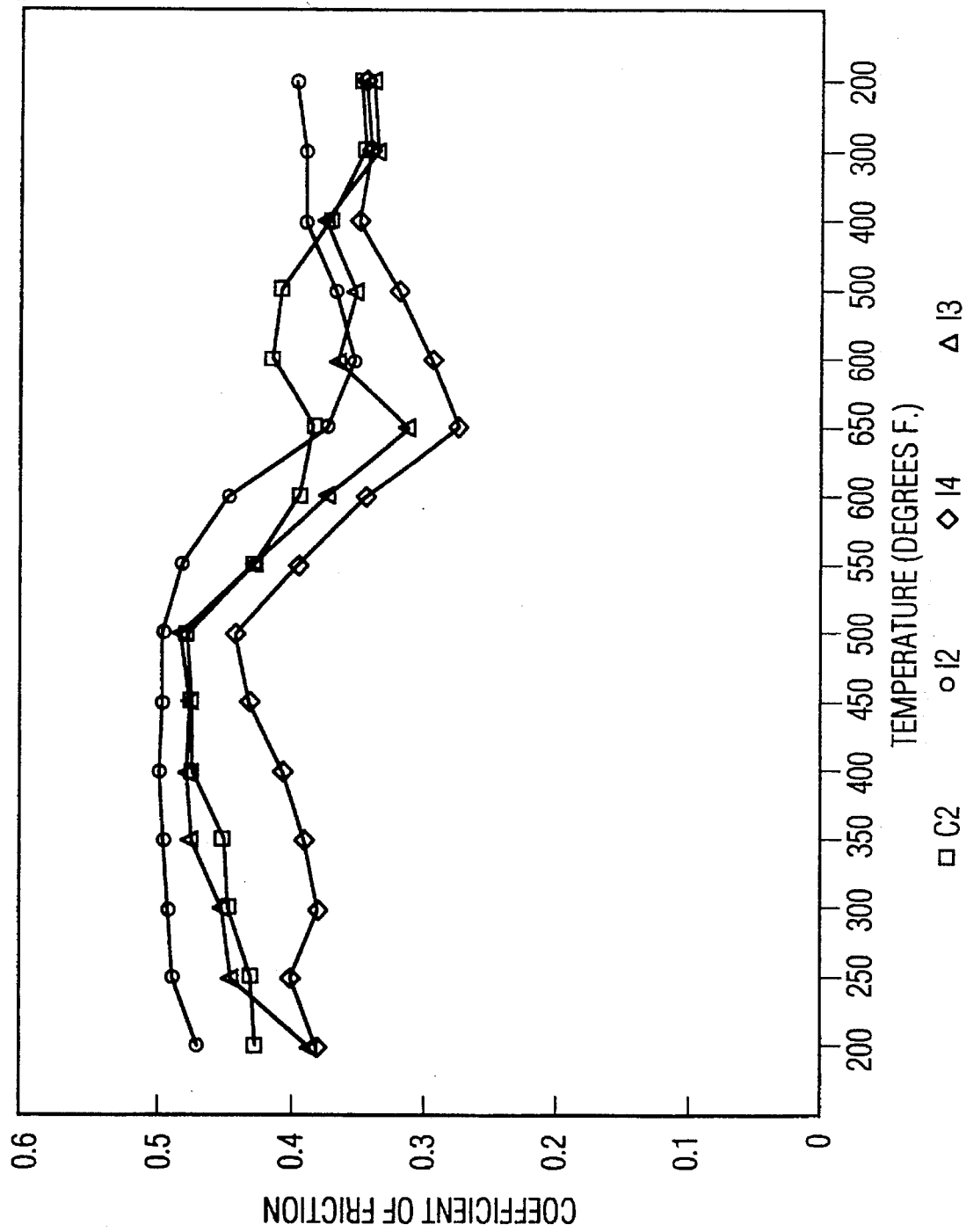
FIG. 2B is a graph showing second fade and recovery data for the sample of Example II.

Using the mixture in Table I, three samples were prepared as in Example I by adding a total fiber. The first sample, designated $I_2$ contained 1.5% fibrillated PAN and 1.5% oxidized PAN cut to an average length of 58 mil. The second sample, designated $I_3$, contained 1.5% fibrillated PAN and 1% oxidized PAN. The third sample designated $I_4$, contained 1.5% fibrillated PAN and 0.5% oxidized PAN. The samples were subjected to the same tests as in EXAMPLE I except that only two samples of $I_4$ were used instead of three because one sample specimen was damaged in testing. TABLE IV shows the test results for the ASTM test on these samples along with $C_2$ from Example I containing 3% fibrillated PAN. Table V shows the results of the coefficient of friction and wear data measurements of the SAE J661 test. FIG. 2B shows in graphical form the data from the "second fade and recovery" portion of the SAE J661 test.

TABLE IV

| | ASTM D790 | | | | ASTM D695 | | | |
| --- | --- | --- | --- | --- | --- | --- | --- | --- |
| | ROOM TEMP | | 400° F. | | ROOM TEMP | 400° F. | | |
| SAMPLE | stress (psi) | modulus (msi) | stress (psi) | modulus (msi) | stress (psi) | stress (psi) | ASTM D696 ($10^6$ in/in. F.°) | Resiliency (% Rebound) |
| $I_2$ | 4857 | 1.42 | 2563 | 0.58 | 8280 | 5190 | 7.11 | 6.5 |
| $I_3$ | 5542 | 1.48 | 2501 | 0.58 | 8280 | 4670 | 7.41 | 6.3 |
| $I_4$ | 4650 | 1.40 | 2517 | 0.62 | 7768 | 5003 | 7.29 | 5.8 |
| $C_2$ | 4875 | 1.27 | 2731 | 0.60 | 7912 | 4670 | 7.89 | 6.5 |

TABLE V

| SAMPLE | Mean Coefficient of Friction | | Wear (% Loss) | Accelerated Wear |
| --- | --- | --- | --- | --- |
| | Normal | Hot | | |
| $I_2$ | 0.49 | 0.41 | 9.38 | 7.81 |
| $I_3$ | 0.44 | 0.38 | 9.82 | 4.68 |
| $I_4$ | 0.39 | 0.33 | 8.13 | 6.92 |
| $C_2$ | 0.45 | 0.38 | 7.59 | 8.10 |

As described above, the preferred blended fiber contains fibrillated and oxidized PAN fibers which are blended and fibrillated in one processing operation. However, various alternative materials and processing methods could be used. For example, the constituent fibers might be prepared separately and intimately mixed as in a Littleford mixer. Alternatively, the constituent components might be added separately to a batch of friction materials and then mixed.

Alternatively, the precise materials mentioned, while preferred, are not required. For example, a PAN fiber tow with approximately 37,000 filaments was used to produce the samples in the examples. Virtually any number of filaments could be used. Also, any high surface area fiber could be used in place of the fibrillated PAN. PAN copolymers may be used in place of the homopolymer described herein. Alternatively, any synthetic fiber which fibrillates to give the required surface area could be used. For example rayon or nylon could be used. Also, natural fibers which fibrillate could be used. For example, wood pulp, cotton, vegetable fibers or flax could be used.

In place of the oxidized PAN, any oxidized carbon fiber precursor could be used. For example, oxidized rayon or pitch fibers could be used.

As another possible modification, materials could be added to the PAN fiber before fibrillation or before oxidizing to increase the frictional properties of the material. For example, metal oxides such as $Al_2O_3$ or $SiO_2$ could be added to the dope used to spin the PAN fibers. Similarly, carbon black pigment or other carbonaceous material might be added.

It will be appreciated, therefore, that the invention should be limited only by the spirit and scope of the appended claims.

We claim:

1. A fiber blend for use in friction materials comprising:
   a) a high surface area component, consisting essentially of fibrillated polyacrylonitrile fiber; and
   b) a strength component consisting essentially of oxidized carbon fiber precursor.

2. A fiber blend of claim 1 wherein the high surface area component has a surface area greater than 10 m²/gm.

3. A fiber blend of claim 1 wherein the high surface area component and the strength component are uniformly mixed.

4. A fiber blend for use in friction materials comprising:
   a) a high surface area component, consisting essentially of fibrillated polyacrylonitrile fiber having a surface area in excess of 10 m²/gm; and
   b) a strength component consisting essentially of oxidized carbon fiber precursor, wherein the high surface area component and high strength component are uniformly mixed.

* * * * *